2 Sheets—Sheet 2.
S. SHERMAN.
Corn-Stub Cutter and Splitter.
No. 220,877. Patented Oct. 21, 1879.
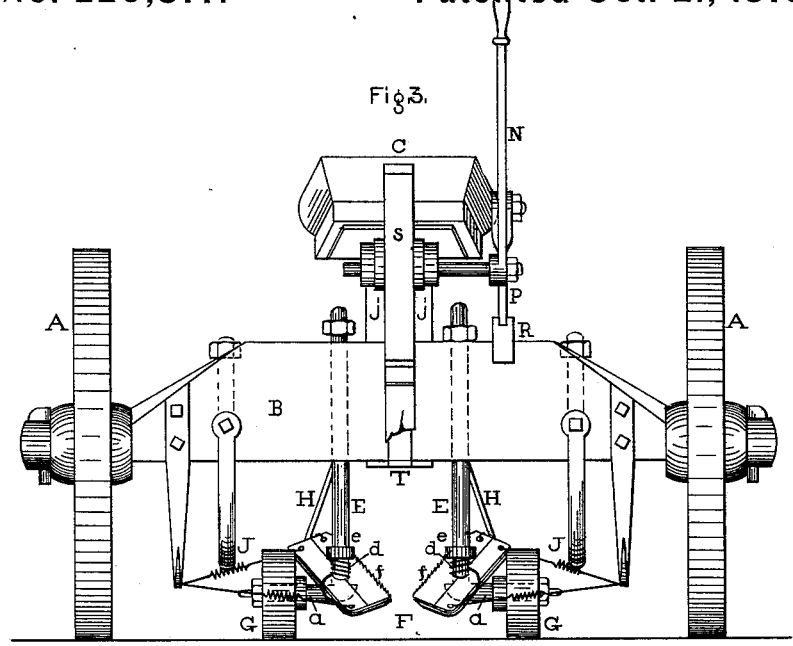
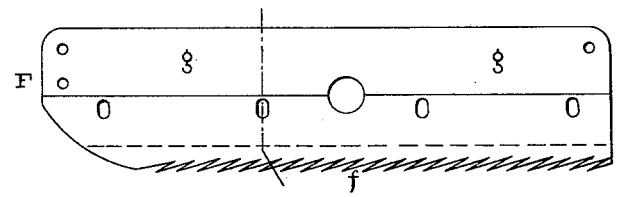
Witnesses:
J. A. Burtt.
W. F. Kucher
Inventor:
Sam'l Sherman,
by John A. Biedershein.
ATTORNEY.

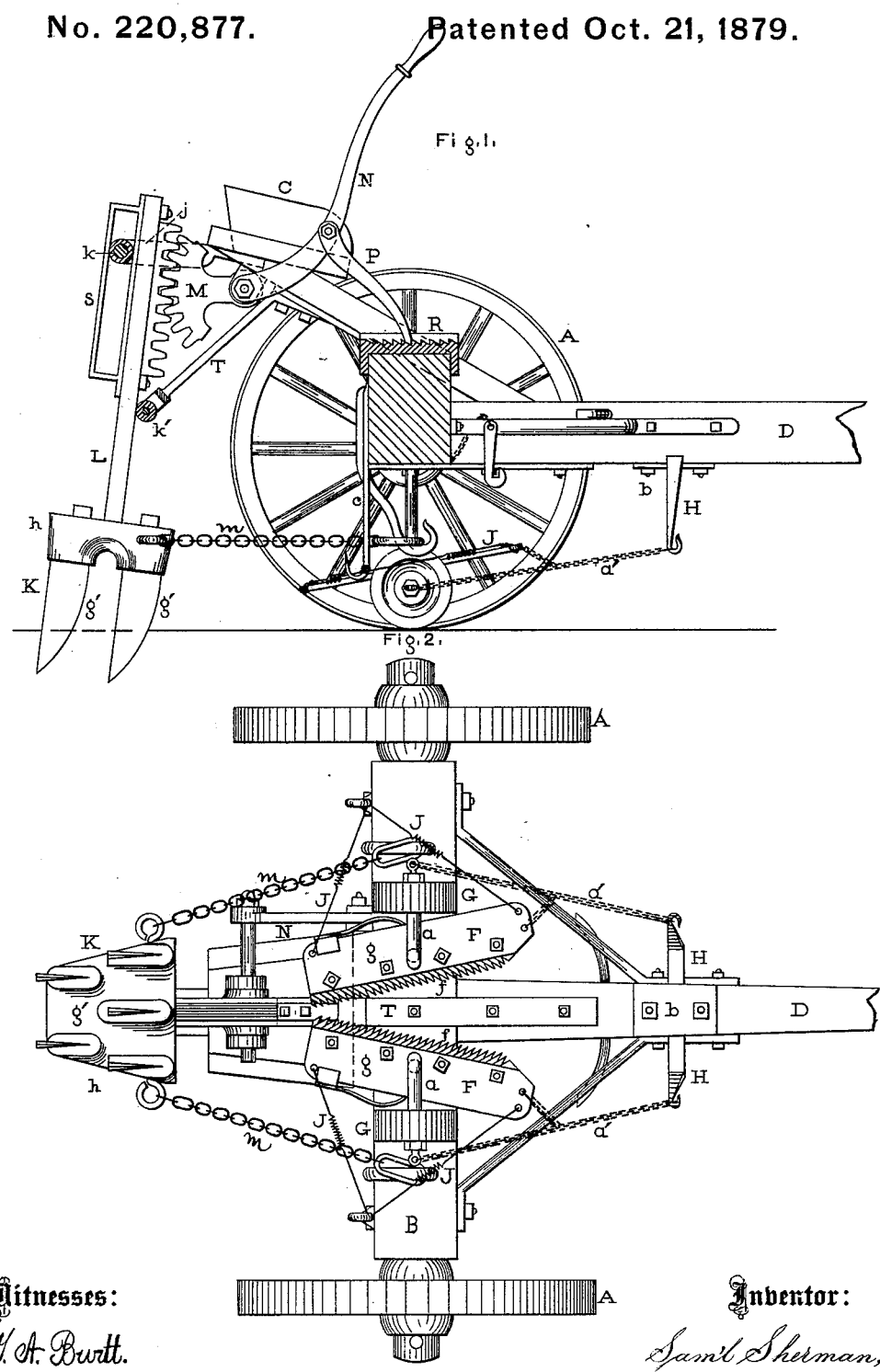

UNITED STATES PATENT OFFICE.

SAMUEL SHERMAN, OF UNIONVILLE, NEAR MOUNT HOLLY, NEW JERSEY.

IMPROVEMENT IN CORN-STUB CUTTERS AND SPLITTERS.

Specification forming part of Letters Patent No. 220,877, dated October 21, 1879; application filed August 14, 1879.

*To all whom it may concern:*

Be it known that I, SAMUEL SHERMAN, of Unionville, near Mount Holly, in the county of Burlington and State of New Jersey, have invented a new and useful Improvement in Corn-Stub Cutters and Splitters, of which the following is a specification, reference being had to the accompanying drawings, in which—

Figure 1 is a side elevation, partly sectional, of the apparatus embodying my invention. Fig. 2 is a bottom view thereof. Fig. 3 is a rear view thereof. Fig. 4 is an enlarged view of one of the cutters. Fig. 5 is a transverse section thereof.

Similar letters of reference indicate corresponding parts in the several figures.

My invention consists of flaring blades having cutting-edges formed of pointed teeth with sharpened sides, which pierce and cut through the tough coating or skin of corn-stubs, so as to effectively sever them.

It also consists in securing the blades to vertically-adjustable standards, so as to be permitted to rise and fall, due to inequalities of the ground, the blades being supported on wheels which run on the ground and adapted to rise and fall independently of each other.

It also consists in providing the blades with springs which permit them to yield laterally, due to strain or obstacles, and afterward cause them to resume their normal positions.

It further consists in connecting the blades and axles of the supporting-wheels thereof to the draft pole or tongue by means of chains or straps and adjustable hangers, so as to properly sustain the blades and adjust the draft thereof.

It also consists of a slicer, which is vertically adjustable and braced in various ways, in order to endure the strain to which it is subjected in service, as will be hereinafter set forth.

Referring to the drawings, A represents wheels, which are mounted on an axle, B, and C represents the driver's seat, which is supported on said axle or the tongue D in any suitable manner. On each side of the center of the axle B are vertical openings, through which are passed, loosely, standards or rods E, to whose lower ends are secured cutters F, which extend horizontally and longitudinally, and are brought together at their heels so as to flare in front. Each cutter is supported on a wheel, G, the axle $a$ whereof is secured to the cutter, and the outer end of each axle $a$ and forward end of each cutter are connected, by means of chains $a'$, to hangers H, which depend from the tongue D, and are adjustably secured thereto by a plate, $b$.

J represents coiled springs, the ends whereof are connected to the front and rear of the cutters F, and to pendants $c$ on the axle B. Springs $d$ are also interposed between the cutters F and collars $e$, fitted on the standards E, and their ends are secured to said collars and the cutters.

The cutters F consist of blades, the cutting-edges whereof are formed of pointed teeth $f$, having sharpened sides, and set angularly forward, so as to present the points of the teeth to the stubs to be cut. The blades are secured to heads $g$ by means of bolts which pass through openings in the heads and slots in the blades, whereby, as the teeth $f$ wear away or become dull, the blades may be set out from the heads, so as to uncover a greater portion thereof for purposes of sharpening, &c.

K represents the slicer, consisting of a series of vertical blades, $g'$, alternately arranged and bolted or otherwise secured to a head, $h$, from which rises a rack bar or stem, L, fitted freely between guides $j$, projecting rearward from the driver's seat. Meshing with the teeth of the stem is a segmental pinion, M, whose axis or shaft is mounted on ears or hangers on the driver's seat, and has connected to it an operating lever, N, the handle whereof is conveniently accessible from said seat. To the lever N is pivoted a foot, P, whose free end is adapted to engage with a rack or toothed bar, R, secured to the axle B, and facing upward in order to hold the slicer to its work.

In order to fully guide the slicer in its vertical motions a roller, $k$, is mounted on the outer ends of the guides $j$, and it bears against the back of the rack bar or stem L and an upright yoke, S, whose ends are secured to said stem. A roller, $k'$, also bears on the forward side of the rack bar or stem, beneath the toothed portion thereof, and is mounted on an arm, T, which continues under the driver's seat, then along the rear and under side of the axle B and under the tongue D, and is secured to the seat, axle, and tongue, thus providing a firm and reliable brace for the seat.

The operation is as follows: The apparatus is drawn forward by animal or other power, and when the stubs are about to be reached the lever N is properly elevated, so as to depress the slicer K the required extent. The foot P is then engaged with the relative tooth of the bar R, and serves to hold the slicer down to its work. The teeth $f$ of the cutter F first pierce the tough coating or skin of the stubs, thus preventing slipping of the cutters therefrom, and the sharp sides of said teeth quickly cut through the stubs, so as to easily sever them. The portion of the stub remaining in the ground is then subjected to the action of the knives of the slicer K, and thus split or separated in a perpendicular direction, preparatory to plowing or overturning. The cutters F, supported on the wheels G, rise and fall, due to the inequalities of the ground, and when their toothed edges are strained or meet with obstacles, the power of the springs J $d$ are overcome, whereby the cutters yield, and are prevented from breakage; after which, when released, they return to their normal positions. The hangers H, as has been stated, are connected, by means of chains $a'$, to the cutters F and axles of the wheels G, and serve to sustain the cutters, and, owing to the plate $b$, which may be tightened against or loosened from the tongue D, the hangers may be raised or lowered in order to adjust the draft of the cutters.

When the slicer is not required for service it may be raised by lowering the lever N, in which case the foot P is first disengaged from the holding-tooth of the bar R, and it may be afterward folded on said bar.

Chains $m$ are secured to a proper part or attachment of the axle and the head of the slicer, as a brace or connection for the bottom of the rack-stem, and providing means for sustaining the head of the slicer when it strikes the stubs.

Having thus described my invention, what I claim as new, and desire to secure by Letters Patent, is—

1. The cutter consisting of two blades, F, brought together at their heels, so as to flare in front, and each provided with a series of teeth, $f$, set angularly forward, substantially as and for the purpose set forth.

2. Two independent blades, F, in combination with the supporting-wheels G and the guide-rods E, passed loosely through the axle, substantially as and for the purpose set forth.

3. The blades F, in combination with the springs J, substantially as and for the purpose set forth.

4. The blades F, and draft pole or tongue D, with the plate $b$, in combination with the hangers H and connections $a'$, substantially as and for the purpose set forth.

5. The slicer K, with rack bar or stem L, and the pinion M, in combination with the guides $j$, roller $k$, yoke S, and arm T, with roller $k'$, said rollers $k\ k'$ being on opposite sides of the stem L, substantially as and for the purpose set forth.

6. The slicer K $g'\ h$, with rack bar or stem L, and the pinion M, in combination with the top guides $j$, roller $k$, yoke S, and the bottom connection, $m$, substantially as and for the purpose set forth.

SAMUEL SHERMAN.

Witnesses:
 ROBT. L. NIXON,
 JOHN W. BROWN.